United States Patent [19]

Abe et al.

[11] Patent Number: 5,271,067
[45] Date of Patent: Dec. 14, 1993

[54] OPTICAL CHARACTER RECOGNITION APPARATUS

[76] Inventors: Keiko Abe; Takayuki Fujikawa, both of c/o Sony Corporation, 7-35, Kitashinagawa 6-chome, Shinagawa-ku, Tokyo; Susumu Takasaki, c/o Toppan Printing Co., Ltd., 5-1, Taito 1-chome, Taito-ku, Tokyo, Japan; Katsumasa Sakai, c/o Toppan Printing Co., Ltd., 5-1, Taito 1-chome, Taito-ku, Tokyo, Japan; Hiromichi Aoki, c/o Toppan Printing Co., Ltd., 5-1, Taito 1-chome, Taito-ku, Tokyo, Japan

[21] Appl. No.: 644,221

[22] Filed: Jan. 22, 1991

[30] Foreign Application Priority Data

Jan. 19, 1990 [JP] Japan ..................................... 2-9986

[51] Int. Cl.⁵ .............................................. G06K 9/34
[52] U.S. Cl. ........................................... 382/9; 382/10
[58] Field of Search ................... 382/9, 10, 22, 37, 48, 382/38

[56] References Cited

U.S. PATENT DOCUMENTS 4,180,799 12/1979 Smith .................................... 382/20
4,607,385 8/1986 Maeda ..................................... 382/9
4,654,873 3/1987 Fujisawa et al. ......................... 382/9
4,783,835 11/1988 Satoh ..................................... 382/20
4,903,313 2/1990 Tachikawa .............................. 382/9

Primary Examiner—David K. Moore
Attorney, Agent, or Firm—Hill, Steadman & Simpson

[57] ABSTRACT

An optical character recognition apparatus is comprised of an original document reading out section for generating an original character signal corresponding to light and shade of an original document, a character slice section for sequentially generating a slice signal corresponding to one character from the original character signal, a character recognition section for recognizing a character corresponding to the slice character signal, and a display section for displaying a recognized character in correspondence to the original document, wherein when a correction target character is found from the displayed characters, the correction target character and characters around the correction target character are displayed on the display section by utilizing the original character signal. Therefore, the operator can efficiently correct the correction target character without consulting the original document, and also the operator can easily confirm by an image of that original document that a separate character or the like is erroneously recognized.

1 Claim, 7 Drawing Sheets

FIG. 2 (PRIOR ART)
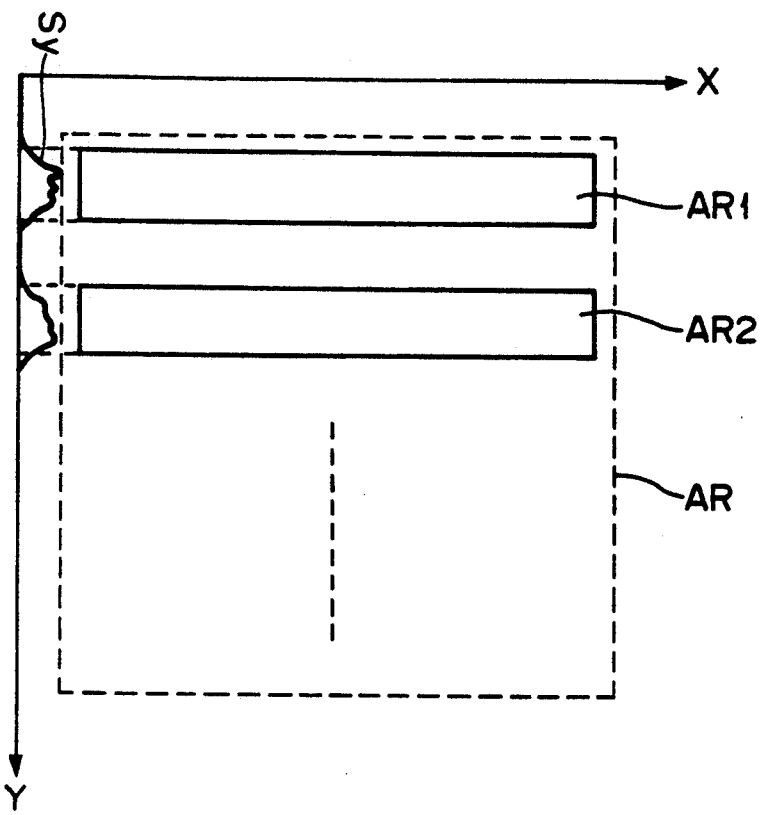
FIG. 3A (PRIOR ART)
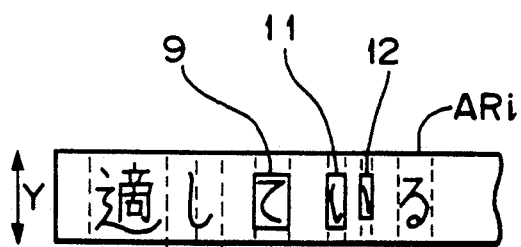
FIG. 3B (PRIOR ART)
FIG. 3C (PRIOR ART)
FIG. 3D (PRIOR ART)
FIG. 3E (PRIOR ART)
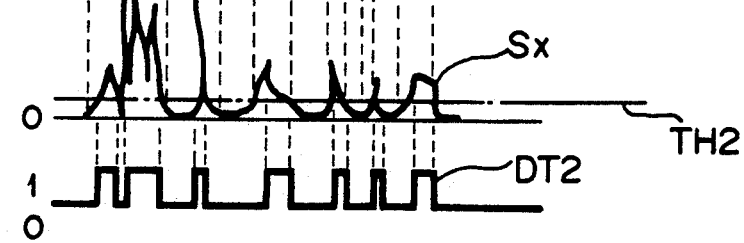

OPTICAL CHARACTER RECOGNITION APPARATUS

BACKGROUND OF THE INVENTION

1. Field of the Invention

The present invention relates generally to optical character recognition apparatus and, more particularly, to an optical character recognition apparatus suitable for recognizing, for example, a character of a printing document so that a recognized character is converted into a character code.

2. Description of the Prior Art

In order to automate a process in which an operator selects types, for example, in the type printing, a character recognition apparatus is needed, in which respective characters on the original document are recognized and converted into character codes.

FIG. 1 shows a schematic arrangement of a conventional character recognition apparatus which is described in Japanese Patent Laid-Open Gazette No. 62-74181.

In FIG. 1, reference numeral 1 designates an original document reading section, and an original character signal S1 corresponding to light and shade of one page amount of the original document is supplied from this original document reading section 1 to a character string slice section 2. While this original character signal S1 is formed by analyzing the original document by a predetermined density at every dot to thereby express a black dot in a high level "1" and to express a white dot in a low level "0", it is frequently observed that concentrations of respective dots are expressed by a binary number of a plurality of bits.

The character string slice circuit 2 is comprised of a first stage preprocessing section 3, a second stage preprocessing section 4 and a third stage preprocessing section 5. The original character signal S1 is preprocessed by the first stage preprocessing section 3 so that a noise thereof is removed and that the original document is rotated and corrected. In the second state preprocessing section 4, a character area AR (see FIG. 2) is distinguished from other areas (areas of photograph, drawing and so on) and only image data involved in that character area AR is extracted. In the third stage preprocessing section 5, a character string signal S4 corresponding to character strings AR1, AR2, ... involved in the character area AR extracted is extracted.

In order to extract the character string S4, as shown in FIG. 2, the position of each dot in the character area AR is expressed by (X, Y) coordinates in which an X axis is presented in the horizontal direction and a Y axis is presented in the vertical direction. Then, values of "1" or "0" of respective dots are projected onto the Y axis and summed to thereby generate a Y projection signal Sy. Then, if this Y projection signal Sy is converted into a binary value by a predetermined threshold level, intervals of high level "1" of the binary-converted-signals are made corresponding with the character strings AR1, AR2, ... and the character string signal S4 is supplied to a succeeding character slice section 6.

In the character slice section 6, a character string signal S4 of i'th character string ARi shown, for example, in FIG. 3A is projected onto the X axis to thereby generate an X projection signal Sx, and a coarse slice signal DT1 (see FIG. 3C) is obtained by converting the X projection signal Sx into a binary signal by a threshold value TH1 of the minimum level (value is 1). Then, a fine slice signal DT2 (see FIG. 3E) is obtained by converting this X projection signal Sx by a threshold value TH2 (see FIG. 3D) of an intermediate level. In a similar fashion, by generating the Y projection signals Sy during the intervals in which the fine slice signal DT1 is at high level "1", it is possible to generate a slice signal of the Y direction. Finally, as shown in FIG. 3A, with respect to, for example, a character [て], a slice signal which goes high level "1" in the inside of the circumscribed frame 9 circumscribing this character from its outside is obtained, and with respect to a separate character [い], a slice signal which goes high level "1" in the inside of circumscribed frames 11 and 12 circumscribing respective separate portions from their outsides is obtained. Then, a fundamental square slice character signal S7 is obtained by sequentially slicing only the portion in which the slice signal goes high level "1" from the input character string signal S4.

The fine slice signal DT2 of FIG. 3E is used to check a more detail structure of each character. Further, with respect to the separate character [い] of FIG. 3A, there are provided two circumscribed frames 11 and 12, which must be synthesized in the later character recognition step.

Referring back to FIG. 1, a character recognition section 7 is shown to receive the fundamental square slice signal S7 at every circumscribed frames to thereby perform the character recognition. More specifically, the pattern matching processing is performed by utilizing characters (['], [''], ['], etc.) existing in the range of upper half portion of the character string ARi of FIG. 3A and characters ([°], [°], [, ], etc. existing in lower half portion thereof as the first characteristic characters and corresponding character codes (JIS (Japanese industrial standards) codes and so on) are given to the character string ARi. If the character cannot be recognized by the above processing, then the character string ARi is categorized by an aspect ratio, h/w and a relative size where w is the width of the circumscribed frame and h is the height thereof. More specifically, the character is classified by determining whether the aspect ratio h/w falls in a range of $0 < h/w < 0.5$ or in a range of $1.5 < h/w$. Further, the character is classified by determining whether a longitudinal relative ratio $h/h_R$ and a lateral relative ratio $w/w_R$ fall in a range of $0 < h/h_R < 0.5$ and in a range of $0 < w/w_R < 0.5$ where $w_R$ is the width of the circumscribed frame of average size and $h_R$ is the height thereof, respectively. Then, the pattern matching processing is performed by utilizing characters lying in the above-mentioned ranges as the second characteristic character.

Characters, which are not categorized as the first and second characteristic characters, are processed by the pattern matching system with the dot patterns individually stored. If a predetermined coincidence is obtained, then that character code is given to the character. If characters, which cannot be recognized by the above processings, remain, an operation in which the circumscribed frame is further separated into a plurality of minute circumscribed frames and the operation in which these minute circumscribed frames are synthesized with the following circumscribed frame are executed. Incidentally, if a character, which cannot be recognized finally, remains, a reject code indicating that the character is a character which cannot be recognized, is assigned to that character.

Character codes of one page of the original document which are generated by the character recognition section 7 are stored in a predetermined memory apparatus together with informations indicating the position and size of the character.

Further, in order for the operator to determine whether or not the recognized result is correct, a video signal of character corresponding to that character code is supplied to a display section 8, such as a cathode ray tube (CRT) or the like. As a consequence, a group of characters are displayed on the display screen of the display section 8 as recognized results in the system corresponding to the original document. In that case, a square blank of high brightness is displayed on the portion of the character that cannot be recognized. Accordingly, if there exist the correction target character and the character which cannot be recognized, then the operator can typewrite a desired character in that portion in the same manner as that of the word processor.

As described above, the original character signal S1 corresponding to the light and shade of the original document is generated, this original character signal S1 is sliced by the circumscribed frame circumscribing one character to thereby generate the slice character signal S7 and the character corresponding to this slice character signal S7 is specified. Heretofore, it can be said that the above-mentioned character recognition algorithm itself is fundamentally established.

However, there arise various disadvantages from a manipulation standpoint when the operator operates this optical character recognition apparatus using such character recognition algorithm at office in actual practice.

One of such disadvantages is that it is very cumbersome to correct a character which is provided as a result of recognition. More specifically, while the character, which cannot be recognized, is displayed as a blank portion in the conventional character recognition apparatus, the original document must be copied beforehand or the original document must be picked up from the original document reading out section 1, each of which work is cumbersome for the operator because the character, which cannot be recognized and displayed as the blank portion, cannot be confirmed without consulting the original document in actual practice.

In order to remove such disadvantages, it is proposed to display an original document dot pattern corresponding to correction target characters (including characters which cannot be recognized). In that case, although only the dot pattern of the correction target character is displayed, if a separate character is extracted and recognized erroneously, there is then the disadvantage that the entire shape of the separate character printed on the original document cannot be predicted from the dot pattern of one portion of the separate character only.

Further, if the optical character recognition apparatus erroneously recognizes words [ 誤読 ] on the original document as [ 正読 ] and displays the same, it is frequently observed that the operator cannot determine whether the word on the original document is [ 誤読 ] or [ 正読 ]. At that time, even when only the dot pattern of the character [ 貝 ] the original document and which corresponds with the displayed character [ 言 ] is displayed, the operator cannot determine whether or not the word on the document is really the word [ 誤読 ].

OBJECTS AND SUMMARY OF THE INVENTION

Accordingly, it is an object of the present invention to provide an improved optical character recognition apparatus which can eliminate the aforenoted shortcomings and disadvantages encountered with the prior art.

More specifically, it is an object of the present invention to provide an optical character recognition apparatus by which the operator can efficiently correct a character without consulting an original document.

It is another object of the present invention to provide an optical character recognition apparatus by which the operator can accurately correct even a separate character.

According to an aspect of the present invention, an optical character recognition apparatus is comprised of an original document reading out section for generating an original character signal corresponding to light and shade of an original document, a character slice section for sequentially generating a slice signal corresponding to one character from the original character signal, a character recognition section for recognizing a character corresponding to the slice character signal, and a display section for displaying a recognized character in contrast to the original document, wherein when a correction target character is found from the displayed characters, the correction target character and characters around the correction target character are displayed on the display section.

The above, and other objects, features and advantages of the present invention will become apparent in the following detailed description of an illustrative embodiment to be read in conjunction with the accompanying drawings, in which like reference numerals are used to identify the same or similar parts in the several views.

BRIEF DESCRIPTION OF THE DRAWINGS

FIG. 2 is a schematic diagram showing an example of a character string used in the conventional prior art optical character recognition apparatus of FIG. 1;

FIGS. 3A-3E are respectively schematic diagrams used to explain an original square slice operation of the conventional prior art optical character recognition apparatus of FIG. 1;

DETAILED DESCRIPTION OF THE PREFERRED EMBODIMENT

An embodiment of an optical character recognition apparatus according to the present invention will hereinafter be described with reference to FIGS. 4 to 8.

Figure 4:
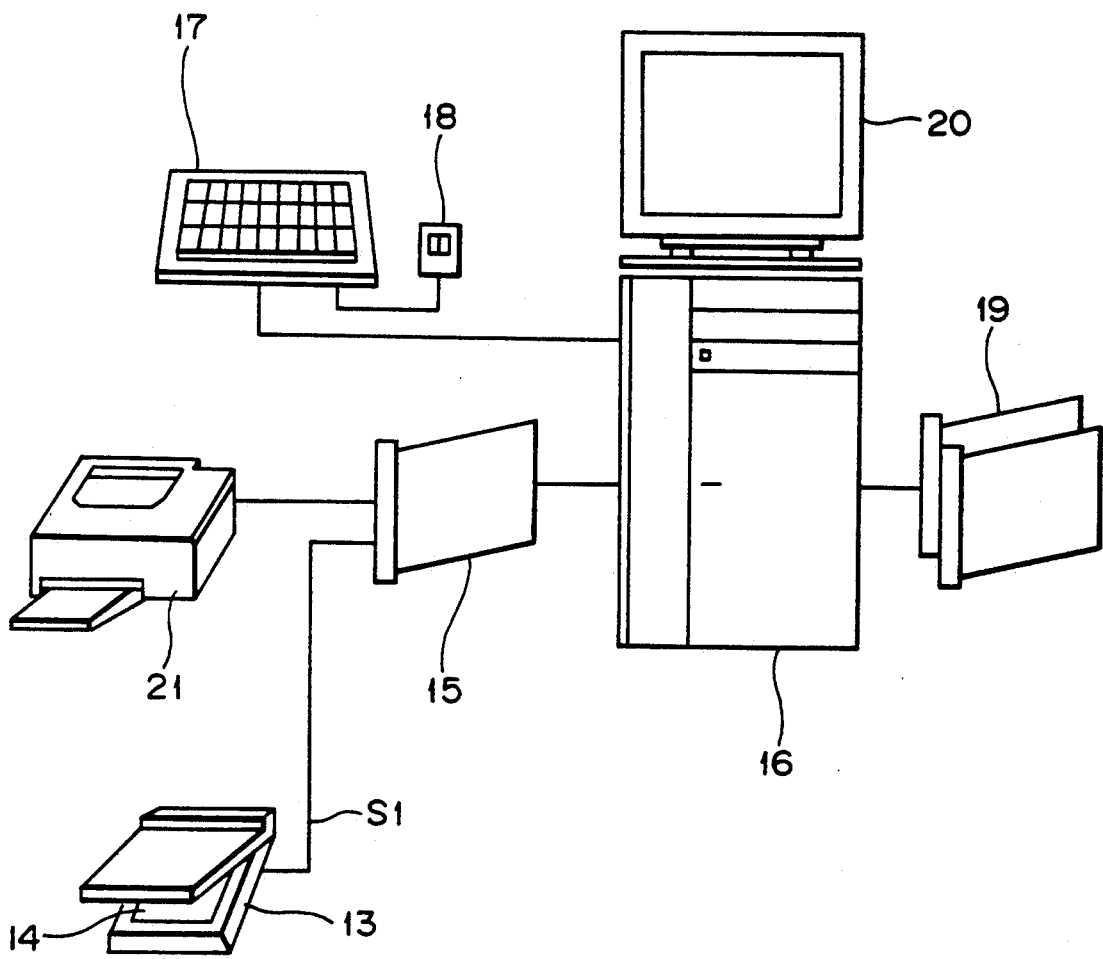
FIG. 4 is a front view of a system arrangement of an embodiment of an optical character recognition apparatus according to the present invention, and illustrating some elements thereof in a perspective view fashion.

FIG. 4 shows an entirety of a system arrangement of an embodiment of the optical character recognition apparatus according to the present invention.

Referring to FIG. 4, a scanner 13 is formed of a document feeder (not shown) and an image reader (not shown), and an original document 14 is placed in this scanner 13. This scanner 13 is adapted to dot-analyze the entirety of one page of the original document 14 at the scan density of, for example, 400×400 dpi (dots-/inch) to thereby generate the original character signal S1 corresponding to the light and shade of each dot.

In FIG. 4, reference numeral 15 designates an image data input and output board, 16 a host computer and 21 a printer. The image data input and output board 15 supplies the host computer 16 with a predetermined portion of the original character signal S1, and also supplies a printing signal output from the host computer 16 to the printer 21. Reference numeral 17 designates a keyboard which is used to operate the host computer 16, 18 a coordinate input unit that is used to input various kinds of coordinates to the host computer 16, and 19 a character identifying board. When the host computer 16 sequentially supplies the character identifying board 19 with the fundamental square slice character signal S7 which is sliced from the original character signal S1 by using a slice signal which goes high level "1" in the inside of the circumscribed frame of one character, the character identifying board 19 supplies a character code C of the character corresponding to the slice character signal S7 (a reject code if the corresponding code cannot be recognized) to the host computer 16.

A display apparatus 20 is formed of a cathode ray tube, and recognized results of characters of one page of the original document 14 are displayed on predetermined areas of the display screen of the display apparatus 20 in a display form corresponding to the original document 14. Further, the display apparatus 20 can display on its display screen a dot pattern of one page or of a predetermined portion of the original document 14.

Figure 5:
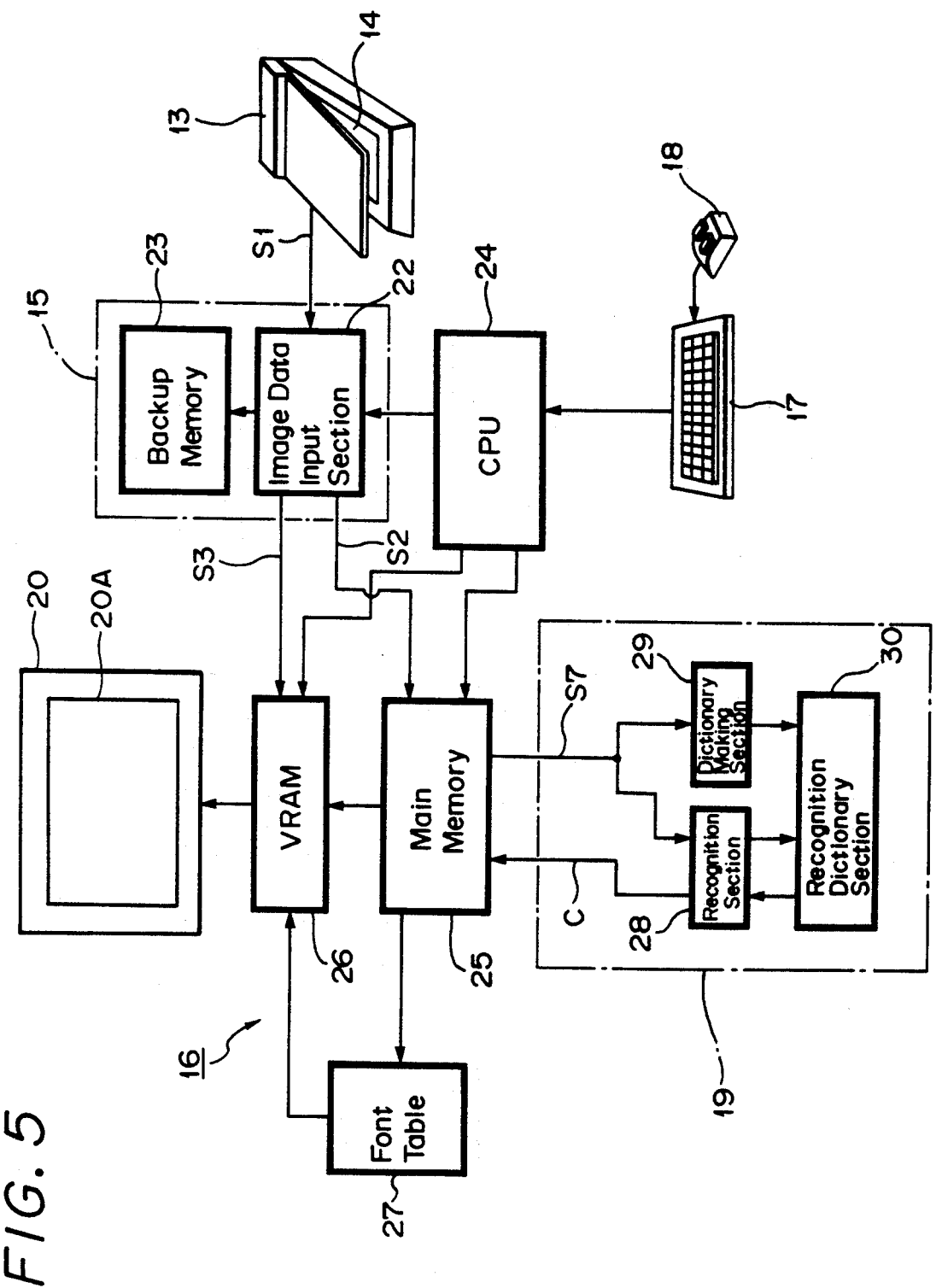
FIG. 5 is a block diagram showing an arrangement of a main portion of the embodiment of FIG. 4 more in detail, and illustrating the same in a fragmentary perspective view fashion.

FIG. 5 shows more in detail the arrangement of the optical character recognition apparatus of the embodiment of FIG. 4, omitting the processing portion associated with the printer 21.

In the image data input and output board 15 of FIG. 5, reference numeral 22 depicts an image data input section having a memory which can store therein dot patterns of more than one page of the original document 14, and 23 a backup memory which can similarly store therein dot patterns of more than one page of the original document 14. The original character signal S1 of one page amount of the original document 14 and which is output from the scanner 13 is stored in this image data input section 22. A desired portion of the original character signal S1 stored in the image data input section 22 is transferred to the backup memory 23 at any time and such desired portion is substituted by the original character signal corresponding to a blank paper in which no characters are written (e.g., Zero level "0"). The original character signal S1 whose desired portion is substituted is called an original character signal S2, and a predetermined portion of this original character signal S2 is called an original character signal S3.

In the host computer 16, reference numeral 24 designates a central processing unit (referred to hereinafter simply as a CPU), 25 a main memory, 26 a video signal RAM (referred to hereinafter simply as a VRAM) for the display apparatus 20, and 27 a font table formed of a character ROM (i.e. read only memory) which receives a character code to thereby output a dot pattern of a predetermined print type corresponding to this character code, that is, a font. When the operator supplies various commands, data and coordinate data to the CPU 24 through the keyboard 17 and the coordinate input unit 18, the CPU 24 controls the operation of the entirety of the character recognition apparatus of this embodiment.

Figure 1:
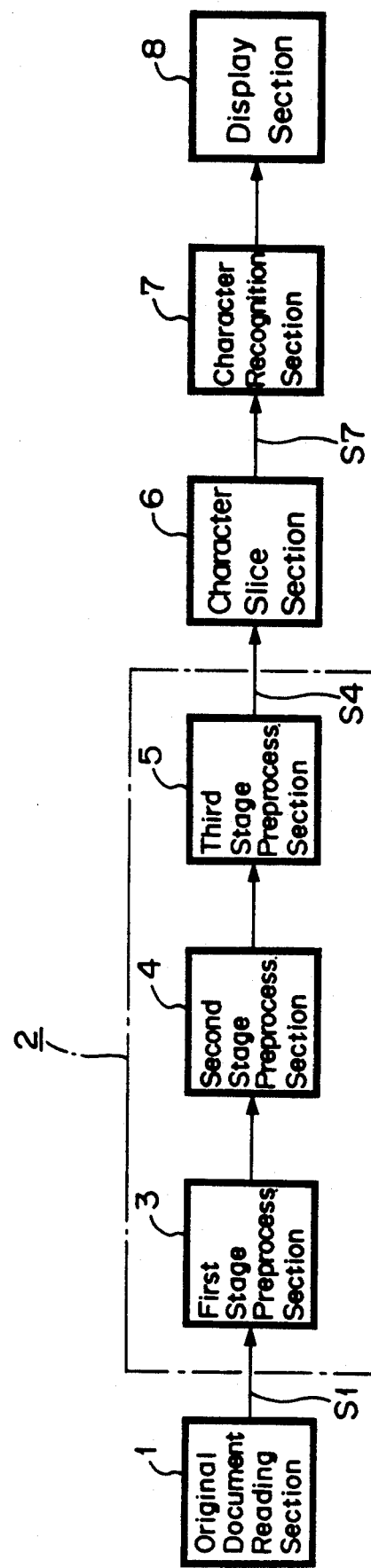
FIG. 1 is a schematic block diagram showing an overall arrangement of a conventional prior art optical character recognition apparatus.

The original character signals S2 and S3 are respectively supplied to the main memory 25 and the VRAM 26 at any time. In that case, the CPU 24 and the main memory 25 are corresponding to the character string slice section 2 and the character slice section 6 of the example of the conventional character recognition apparatus of FIG. 1. The fundamental square slice character signal S7 corresponding to the inside of the circumscribed frame of one character out from the main memory 25 is sequentially supplied to the character identifying board 19, and the character code C transmitted from the character identifying board 19 is supplied through the main memory 25 to the address bus of the font table 27. Font data appearing on the data bus of the font table 27 is written in a predetermined area of the VRAM 26. A system composed of the host computer 16, the keyboard 17, the coordinate input unit 18 and the display apparatus 20 of this embodiment also functions as a word processor.

In the character identifying board 19, reference numeral 28 designates a character recognition section, and 30 a recognition dictionary section in which font data of various print types are stored in correspondence with character codes (JIS (Japanese Industrial Standards coder in this embodiment). The character recognition section 28 and the recognition dictionary section 30 fundamentally correspond with the character recognition section 7 of FIG. 1. The recognition dictionary section 30 of this embodiment is divided into a large categorized dictionary section for large categorized characters and a small categorized dictionary section for small categorized characters. The large categorized dictionary section stores therein first characteristic characters which are categorized on the basis of the positions thereof and second characteristic characters categorized on the basis of values of relative size (aspect ratio, h/w), longitudinal relative ratio $h/h_R$ and a lateral relative ratio $w/w_R$, for example, font data normalized as 24 dots×24 dots in the horizontal and lateral directions. Incidentally, since rough characteristics of character are expressed by dot patterns near respective sides of the circumscribed frame, dot patterns near four sides of the circumscribed frame of the character are converted into numerical values as four-side data (or circumferential data) and font data of character (large categorized character) in which four-side data fall within a predetermined range may be stored in the large categorized dictionary section.

On the other hand, normalized font data of all characters other than those involved in the large categorized dictionary section (small categorized characters) are stored in the small categorized dictionary section in correspondence with character codes.

In FIG. 5, reference numeral 29 designates a dictionary making section. When the dictionary making mode is set by the operator, this dictionary making section 29 determines whether font data expressed by the fundamental square slice character signal of one character amount supplied thereto corresponds with the large categorized character or the small categorized character. If the font data corresponds with the large categorized character, such font data is normalized and written in the predetermined character code area of the large categorized dictionary section of the recognition dictionary section 30. If on the other hand the font data corresponds with the small categorized character, such font data is normalized and written in the predetermined character code area of the small categorized dictionary section of the recognition dictionary section 30. Thus, the user can make the recognition dictionary 30 which can cope with various kinds of print types with ease.

When the character recognition mode is set by the operator, the character recognition section 28 of the character identifying board 19 sequentially writes, if the fundamental square slice character signal S7 supplied thereto corresponds with the large categorized character, the font data of the large categorized character section of the recognition dictionary section 30 in a first first-in first-out (hereinafter simply referred to as FIFO) register and sequentially writes, if the fundamental square slice character signal S7 corresponds with the small categorized character, font data of the small categorized character in a second FIFO register. Together with this operation, the recognition section 28 normalizes dot pattern corresponding to the fundamental square slice character signal S7 and writes the normalized dot pattern in a third FIFO register sequentially. Then, by sequentially comparing the dot pattern of a recognized character in the third FIFO register with a series of font data in the first FIFO register and a series of font data in the second FIFO register, the character recognition section 28 generates 10 character codes corresponding to font data closest to the dot pattern of the recognized character in the order of high priority and writes these character codes in a predetermined area of the main memory 25 of the host computer 16.

The order of priority will be determined as follows. By comparing the dot pattern of recognized character with font data read out from the recognition dictionary 30 with respect to each dot of, for example, 24 dots×24 dots, a total sum of dots in which values of the dot pattern and font data are different is calculated as an evaluated value. Then, the priority orders of the character codes are increased with the decrease of the evaluated value. When the evaluated value of the character code whose priority order is highest is less than a predetermined value, it is determined that the character is recognized. Then, the character code whose priority order is highest is written in the main memory 25 at its area determined in response to the original document 14 as a character code C of the recognized character. Simultaneously, the recognition section 28 writes the character code C, data indicative of the size of the character and data indicating a position at which that character is located within an average circumscribed frame in the main memory 25. When on the other hand the evaluated value of the character code whose priority is highest is larger than the predetermined value, it is determined by the recognition section 28 that the character cannot be recognized. Then, the recognition section 28 writes the reject code in the main memory 25 at its area determined in correspondence with the original document 14. The abovementioned character recognition operation is carried out at high speed in a so-called pipe line fashion.

Figure 6:
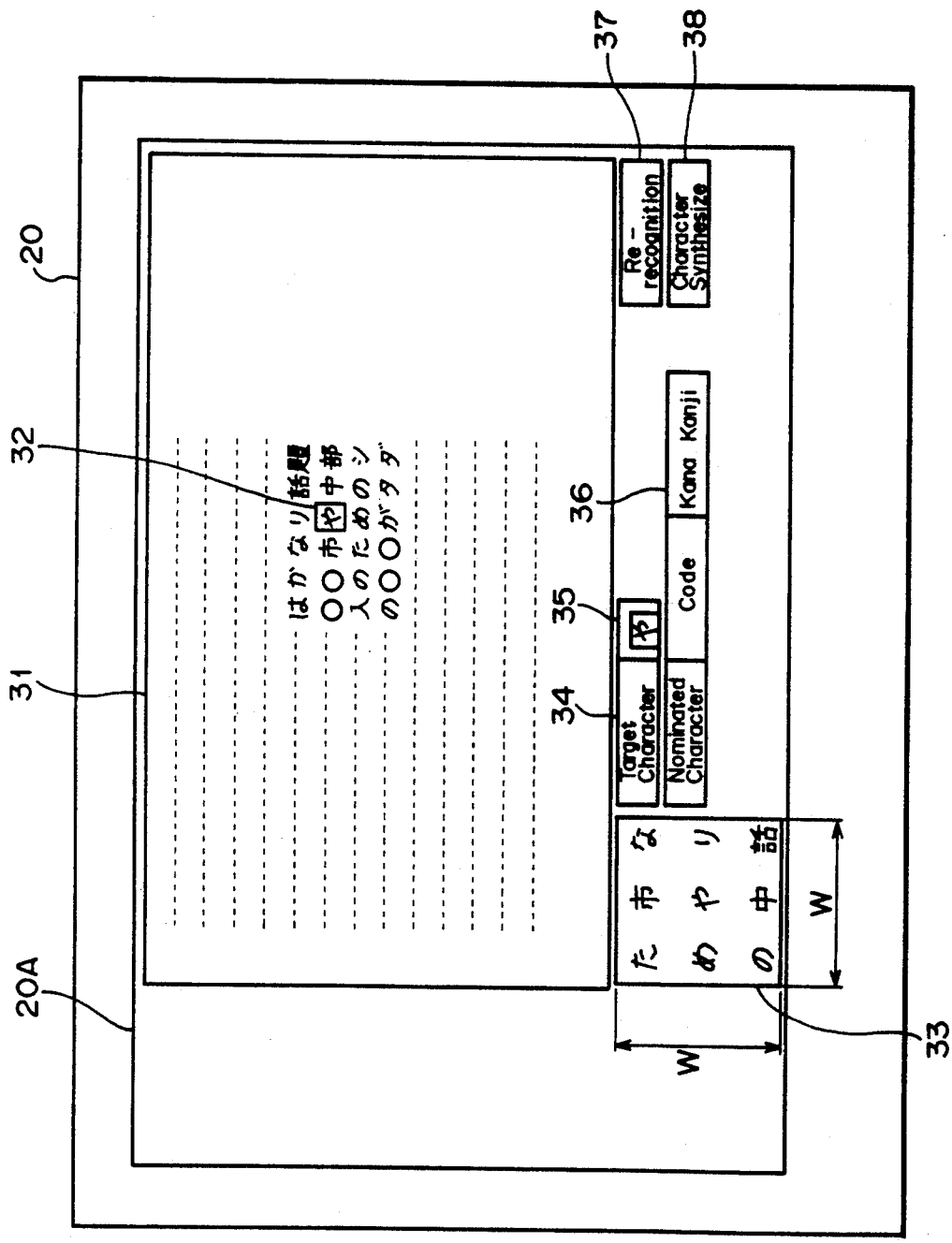
FIG. 6 is a front view illustrating an example of an arrangement of a display screen.
Figure 7:
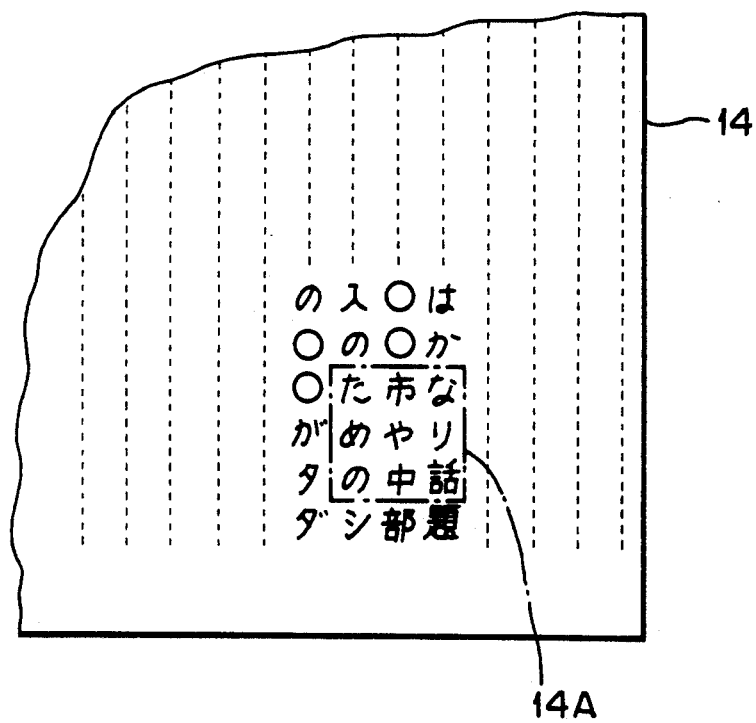
FIG. 7 is a schematic diagram showing an example of an original document.

FIG. 6 shows a display screen 20A of the display apparatus 20 used in this embodiment. This display screen 20A is provided with a recognized result display area 31 on which there are displayed recognized results of characters of one page of the original document 14. In this embodiment, characters are written on the original document 14 along its vertical direction as shown in FIG. 7, and recognized results are displayed on the recognized result display area 31 along its horizontal direction. In FIG. 6, reference numeral 32 designates a cursor that is used to indicate a character to be corrected. This cursor 32 can be moved on an arbitrary character of the recognized result by the keyboard 17 or by the coordinate input unit 18.

In the example of FIG. 6, the cursor 32 stays on a character [$X^?$] so that a word [target character] and a character [$\psi$] are displayed in areas 34 and 35 close to the recognized result display area 31 of the display screen 20A. In FIG. 6, reference numeral 36 designates a function button area, and characters of [nominated character], [code] and [kana-kanji] are displayed on the area 36. These function buttons can be selected by the coordinate input unit 18. If [nominated character] button, for example, is selected, patterns of 10 characters recognized to be closest to a character which is a correction target are displayed on one portion of the display screen 20A in the order of high priority. If [code] button is selected, the correction target character can be directly accessed by a character code. Then, if the [kana-kanji] button is selected, then the correction target character can be input by a kana/kanji conversion method.

In FIG. 6, reference numeral 37 designates a re-recognition button and 38 a character synthesize button. By selecting these buttons 37 and 38 by the coordinate input unit 18, it becomes possible for the operator to execute the synthesize processing of the correction target character in a manual fashion.

In accordance with this embodiment, a circumferential image display area 33 whose area is represented as W×W is provided near the recognized result display area 31 and on this circumferential image display area 33 a dot pattern of area of 170 dots wide and 170 dots high is displayed of the area about a character [$X^?$] on the original document 14 (see FIG. 7) and which corresponds with the character to be corrected.

To be more concrete, as shown in FIG. 5, the CPU 24 reads out the original character signal S3 in the area of 170 dots×170 dots about the target character in the original character signal S2 (the original character signal S1 itself in this embodiment) of one page amount stored in the image data input section 22, enlarges (interpolates) or reduces (thins) this original character signal S3 and writes the same into the predetermined area of the VRAM 26. Accordingly, images of a character [$X^?$] on the original document 14 and which corresponds to the target character [$X^?$] and eight characters )characters within an area 14A of FIG. 7) around this character are displayed on the circumferential image display area 33 of the display screen 20A of FIG. 6 as dot patterns.

When images of the correction target character and the characters around the correction target character are displayed, the operator can correct the correction target character with reference to characters around the correction target character without consulting the original document 14. There is then the advantage that the correction efficiency can be improved. Further, when consecutive characters are to be corrected (e.g., when [ 講託 ] is corrected as [ 媒託 ] or [ 填枯 ]), by designating any one of the characters as a correction target character, images of a series of corresponding characters on the original document are displayed on the circumferential image display area 33, thus making it possible for the operator to correct the correction target character efficiently and accurately.

Another example of the operation of the character recognition apparatus of this embodiment will be explained with reference to FIGS. 8A to 8C.

Figure 8A:
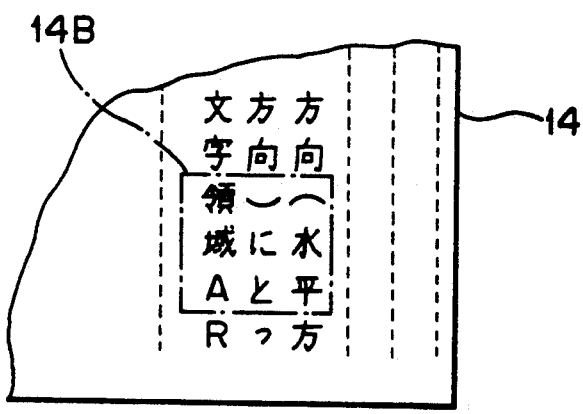
FIGS. 8A-8C are schematic diagrams used to explain other examples of operations of the embodiment of the present invention, respectively.
Figure 8B:
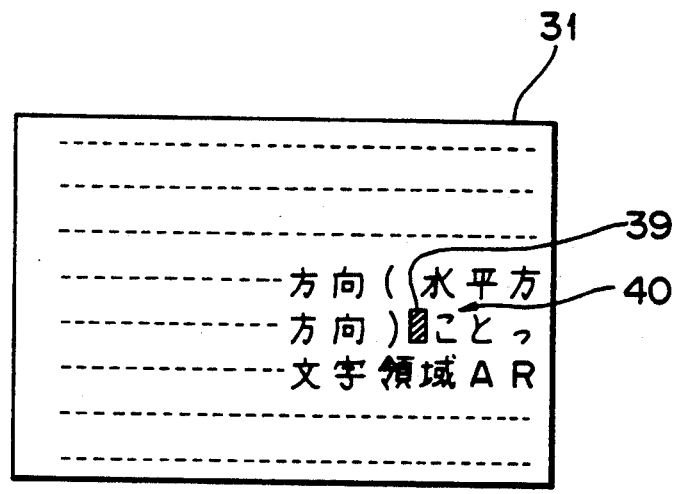

Assuming that an image of the original document 14 is represented as shown in FIG. 8A, then a separate character[ｆニ] exists at the center of the area 14B of the original document 14. In that case, as a result of recognizing the original document 14, if the separate character [ｌニ] is inadvertently recognized as [ニ] and a set of characters that cannot be recognized, then as shown in FIG. 8B, a blank display 39 corresponding to the reject code and the character [丶] are displayed at the position (position shown by an arrow 40) of the character [ｆニ] on the recognized result display area 31 of the display apparatus 20.

Figure 8C:
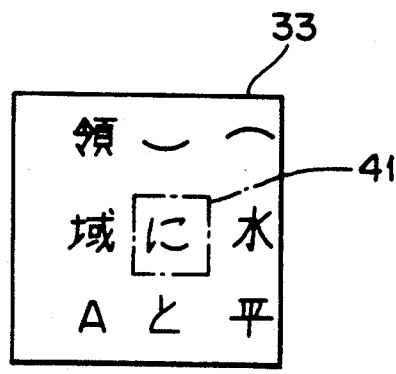

Then, when it is determined by the operator that the recognized result is erroneous and the operator moves the cursor, which indicates the correction target character, to the position of the blank display 39, as shown in FIG. 8C, the image of the area 14B of the original document 14 is displayed on the circumferential image display area 33 as a dot pattern. Accordingly, by the character [ｌニ] existing at substantially the center 41 of the circumferential image display area 33, the operator can easily understand that the character recognition apparatus of this embodiment erroneously recognizes the separate character [(ニ].

As described above, according to this embodiment, even if the separate character is erroneously recognized in the form of a part of a separate character, the image of the entirety of the separate character on the original document 14 is displayed on the circumferential image display area 33 only by designating the further separated portion as the correction target. There is then the advantage that even the separate character can be corrected accurately.

In FIG. 6, the circumferential image display area 33 may be displayed near the cursor 32 in, for example, the recognized result display area 31. Alternatively, the circumferential image display area 33 may be displayed on a liquid crystal display (LCD) panel which is provided independently of the display apparatus 20.

As set out above, according to the present invention, the character can be efficiently corrected without consulting the original document and even the separate character can be accurately corrected, which provides great advantages in actual practice.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

We claim as our invention:

1. An optical character recognition apparatus comprising:
    (a) an original document reading out section for generating an original character signal corresponding to light and shade of a printing character of an original document;
    (b) a character slice section for sequentially generating a slice signal corresponding to one character from said original character signal;
    (c) a character recognition section responsive to said original character signal and to said slice signal for recognizing a character corresponding to said slice character signal;
    (d) a first display section connected to receive said original character signal for displaying a recognized character in its corresponding place in said original document; and
    (e) a second display section located adjacent said first display section for displaying a selected correction target character and the characters around said correction target character in an enlarged scale relative to the characters displayed on said first display section.

* * * * *